United States Patent
Lalive et al.

(10) Patent No.: US 8,757,144 B2
(45) Date of Patent: Jun. 24, 2014

(54) ABSORBER FOR A THERMAL SOLAR PANEL

(76) Inventors: Francois Lalive, Clarens (CH);
Ludmilla Lalive, Clarens (CH)

( * ) Notice: Subject to any disclaimer, the term of this patent is extended or adjusted under 35 U.S.C. 154(b) by 835 days.

(21) Appl. No.: 12/812,859

(22) PCT Filed: Jan. 7, 2009

(86) PCT No.: PCT/EP2009/050119
§ 371 (c)(1),
(2), (4) Date: Jul. 14, 2010

(87) PCT Pub. No.: WO2010/069608
PCT Pub. Date: Jun. 24, 2010

(65) Prior Publication Data
US 2011/0048410 A1    Mar. 3, 2011

(30) Foreign Application Priority Data
Dec. 18, 2008 (EP) .................................. 08106014

(51) Int. Cl.
*F24J 2/22* (2006.01)
(52) U.S. Cl.
USPC ........... 126/674; 126/675; 126/670; 126/647; 126/628; 165/170
(58) Field of Classification Search
USPC ........... 126/674, 675, 670, 647, 628; 165/170
See application file for complete search history.

(56) References Cited

U.S. PATENT DOCUMENTS

| | | | | |
|---|---|---|---|---|
| 3,502,142 A | * | 3/1970 | McGuffey | 165/170 |
| 4,103,675 A | * | 8/1978 | Bar-On et al. | 126/667 |
| 4,474,172 A | | 10/1984 | Burke | |
| 4,858,594 A | * | 8/1989 | McCurdy | 126/672 |
| 5,487,424 A | * | 1/1996 | Davison | 165/166 |

FOREIGN PATENT DOCUMENTS

| | | |
|---|---|---|
| CH | 624753 | 8/1981 |
| FR | 2423734 | 11/1979 |
| WO | WO0114080 | 3/2001 |
| WO | WO2004083556 | 9/2004 |

* cited by examiner

*Primary Examiner* — Avinash Savani
(74) *Attorney, Agent, or Firm* — Woodard, Emhardt, Moriarty, McNett & Henry LLP

(57) ABSTRACT

The invention relates to an absorber (40) for a solar panel, provided for containing a heat transfer fluid (42), including first (44) and second (46) plates arranged opposite each other and attached to each other via a plurality of connection points (58, 60), first and second matrices having protruding geometrical shapes (50, 52) formed on the outer surfaces of the first and second plates, respectively, the matrices being offset relative to each other so as to provide a flow path for the heat transfer fluid in the absorber, an inlet (54) and an outlet (56) for the heat transfer fluid arranged at both ends of the heat transfer fluid flow path, respectively, characterized in that at least some of the geometrical shapes have a generally protruding shape with a recess at the center thereof so as to form a cavity (64, 66), and in that at least some of said non-through connection points are provided in at least some of said recesses.

10 Claims, 5 Drawing Sheets

Coupe I-I

Coupe II-II

Coupe III-III

Coupe IV-IV

ABSORBER FOR A THERMAL SOLAR PANEL

REFERENCE TO RELATED APPLICATIONS

This application is the U.S. nationalization of PCT/EP2009/050119, filed 7 Jan. 2009, which is hereby incorporated by reference. This application claims priority from Patent Application No. EP 08106014.7, filed 18 Dec. 2008, which is hereby incorporated by reference.

TECHNICAL FIELD

The present invention relates in general to a thermal solar panel consisting of converting light into heat. More particularly, the present invention relates to an absorber for such a solar panel provided to contain liquid or heat-bearing fluid.

TECHNOLOGICAL BACKGROUND

The prior art discloses numerous types of thermal solar panels comprising an absorber containing heat-bearing fluid which may be water for example, water mixed with an antigel or even just air.

According to a first category of thermal solar panels illustrated in FIG. 1, these panels 1 comprise an absorber 2 formed by tubes 3 fitted with fins in which heat-bearing fluid circulates in closed circuit. The tubes are heated conventionally by solar radiation and transmit heat to the heat-bearing fluid which circulates inside these tubes. For a higher yield, the absorber is placed in a glazed insulating box, not illustrated here, to get a greenhouse effect. A reflector is usually arranged under the tubes to further boost heat recovery.

Another existing type of absorber comprises a metal plate arranged under the glass panel, and under which are arranged fine metal conduits containing heat-bearing fluid and winding over the entire length of the panel.

Such thermal solar panels have a number of drawbacks, including more especially the mechanical complexity and fragility of the absorber as well as a relatively low yield due to the low volume of heat-bearing fluid for a determined glazed surface of the solar panel.

According to a second category of thermal solar panels, known especially from document CH 624 753, the solar sensor 1, shown in FIG. 2, comprises two metallic plates 2, between which heat-bearing fluid circulates. Pads in the form of bosses 4 are foamed at regular intervals on the metal plates 2. The bosses of one metal plate are offset by a semi-boss relative to those of the other plate. The two metal plates 2 are welded together by means of welding beads 6 made by a roller and arranged so that a turbulent flow of the heat-bearing fluid circulating between the plates is generated. With such a solar sensor, a higher yield can be attained independently of the position of the sun. Also, the turbulent flow brings good heat exchange between the plates metal and heat-bearing fluid. Such a solar sensor can be made at less cost and be easily mounted on the exterior of a roof.

Even though the solar sensor presented within the scope of document CH 624 753 has a higher yield and is mechanically simpler than those comprising tubes, it still has some drawbacks, in particular resistance to pressure exerted by heat-bearing fluid on the metal plates of the sensor. In fact, it has been noted within the scope of the present invention that in normal usage conditions dilation of heat-bearing fluid contained in the sensor causes pressure on the plates, inducing the welding beads located between the bosses to give way.

Document WO 01/14080 in particular also discloses a heat exchanger 23, illustrated in FIGS. 3a and 3b, comprising two walls 13, 15 connected specifically by compression and forming into a plurality of points 11 then sealed at their edge 25. Although this type of alternative solution enables a stronger join of the two walls 13 and 15, it also means some drawbacks and in particular needs a relatively large flat space 19 around each connection point 11. The need for such space 19 makes it difficult to implement on a solar sensor structure such as presented in document CH 624 753. In fact, if the space between the bosses is increased, all the more reducing the communication surfaces between the bosses of the two plates and resulting in making the path of the heat-bearing fluid less efficient, then this space is kept as such and in this case the risk of perforation of a boss is considerably higher and the tightness of the sensor is threatened.

SUMMARY OF THE INVENTION

The aim of the present invention is to respond to the above-mentioned drawbacks, at the same time retaining advantages associated with the second category, by providing an efficacious absorber, that is, having optimised heat yield, but also simple, robust and tight, that is, able to reliably support the pressure of heat-bearing fluid which it contains.

To this end and according to a first aspect, the present invention relates to an absorber for a solar panel, provided to contain heat-bearing fluid, comprising first and second plates arranged opposite one another and fixed to one another by means of a plurality of connection points, first and second matrices of geometric shapes protruding, formed on the outer faces respectively of the first and second plates, the matrices being offset relative to one another so as to trace a circulation path for heat-bearing fluid in the absorber, inlet means and outlet means of heat-bearing fluid arranged respectively at one end and at the other end of the circulation path of the heat-bearing fluid, wherein at least part of the geometric shapes has a general protruding form, hollow in its centre so as to define a cavity, and in that at least some of said connection points, non-traversing, are arranged in at least some of said cavities.

In this way, it is possible to keep joined together the two plates by using a limited number of connection points without diminishing the communication surfaces between the protuberances of the two plates and without risk for tightness of the absorber to the extent where the cavities ensure sufficient space to make an efficacious connection point. The resulting absorber is remarkable in that it combines obtaining good heat yield with a fixing system via non-traversing connection ensuring excellent hold and perfect tightness between the plates.

According to an advantageous variant embodiment, the hollow geometric shapes have a general annular protruding form. Such a form has the advantage of being simple and therefore easily swageable while ensuring an optimised communication surface between the annular forms of a plate with the offset forms of the other plate. Also, it has been shown within the scope of the present invention that the path of the resulting heat-bearing fluid both maximises the sinuous character of the path travelled by the heat-bearing liquid, ensuring optimised heat yield, and also avoiding losses of heat-bearing fluid via the absorber on the possible angles of the geometric shapes of the matrix able to cause unwanted excessive dilation for reasons of mechanical resistance of the absorber.

According to another advantageous variant embodiment, the non-traversing connection points located in cavities are made by mechanical deformation of the two plates so as to join them together. The non-traversing connection points preferably located in cavities are points for clinching the two plates together. It is evident in this respect that the clinching is a mechanical assembly technique of plates, whereof the principle consists of connecting the two plates by stamping between a punch and a matrix without extra material. Even though such a solution requires a considerable space around the clinching point, it proves particularly robust while being rapid, and perfectly adequate due to the cavities in which these connection points are made. Alternatively, the non-traversing connection points located in cavities are rivets swaging the two plates together without perforating any of them.

According to another advantageous variant embodiment, a continuous connection at the periphery of the plates is obtained by ultrasonic welding or laser fusion or welding of the two plates together. The major advantage of using welding by ultrasound or laser fusion or welding is fixing the two plates tightly together, without leaving shavings from plates or other waste material between the plates. Also, this type of continuous welding proves to be faster than traditional welding techniques, this advantage being amplified by the continuous character of the welding. Advantageously, at least one ultrasonic welding or laser fusion or welding line of the two plates is added between the geometric shapes. Adding such welding lines while retaining the advantages of this type of welding without waste reinforces holding the plates together.

According to another advantageous variant embodiment, the inlet means and outlet means of the heat-bearing fluid are arranged diagonally opposite on the external face of one of the two plates. These inlet and outlet means ensure circulation through the absorber and are localised on the external face of the lower plate, once mounted in a panel, such that the joints used are protected from direct exposure to light radiation, which could alter their tightness while retaining maximal surface exposure on the external face of the upper plate of the absorber as well as protection of the glass plate of the panel intended to cover the absorber. Advantageously, these inlet means and outlet means are end fittings arranged on a flat portion of the lower plate opposite to a geometric form of the upper plate to reduce the total thickness of the absorber.

According to a second aspect, the present invention relates to a thermal solar panel comprising an absorber (30) arranged in a frame (31) and covered by a glass plate (32), in which is mounted an absorber as claimed in any one of the variants according to the first aspect and provided to contain the heat-bearing fluid.

According to an advantageous variant embodiment, the lower plate of the absorber is supported by inner rims of the panel.

BRIEF DESCRIPTION OF THE FIGURES

Other characteristics and advantages of the present invention will emerge from the detailed following description of embodiments of the invention given by way of non-limiting examples.

DETAILED DESCRIPTION OF THE INVENTION

Figure 1:
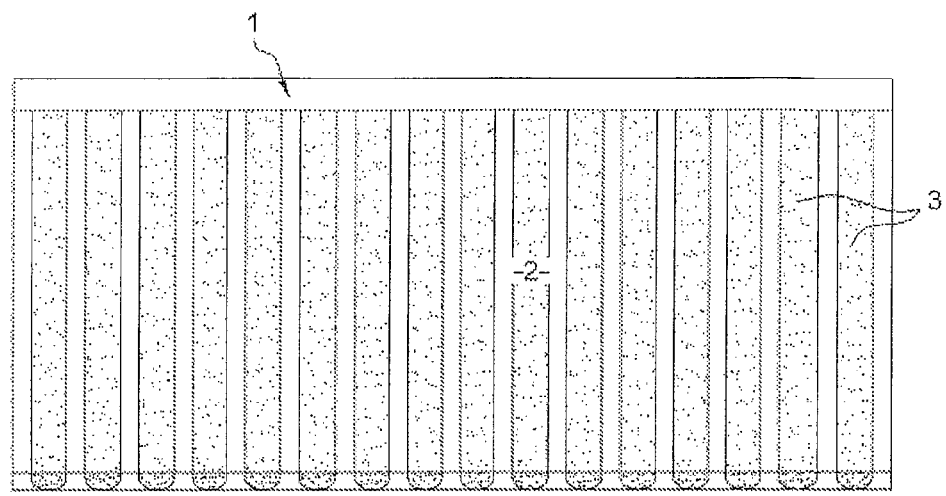
FIG. 1, already described, illustrates a first type of absorber for thermal solar panel according to the prior art.
Figure 2:
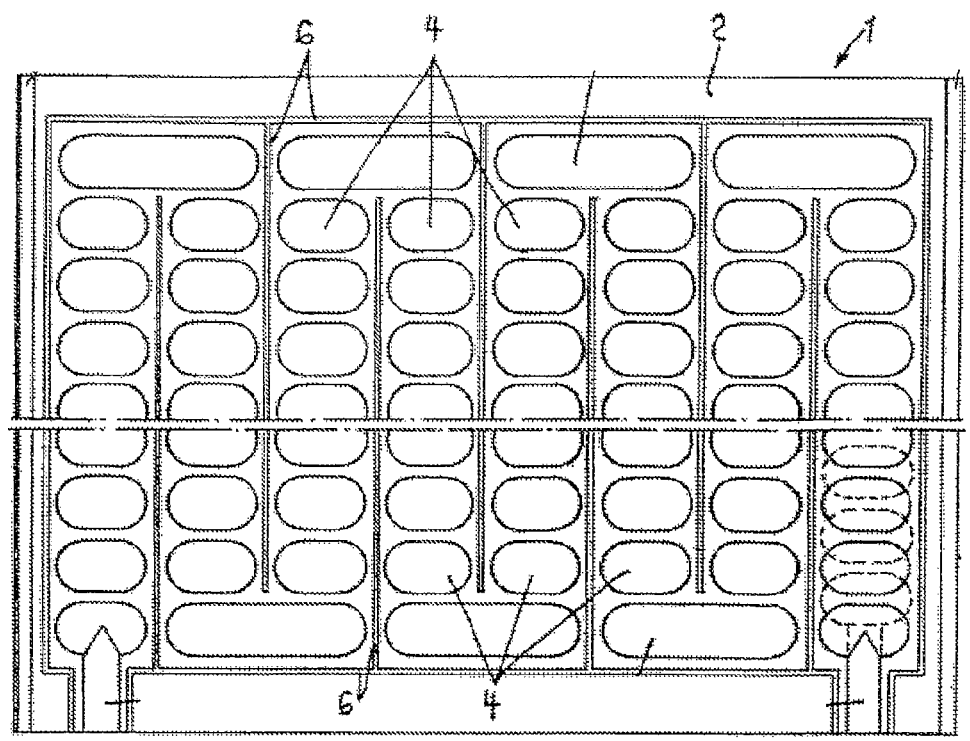
FIG. 2, already described, illustrates a second type of absorber for thermal solar panel according to the prior art.
Figure 3A:
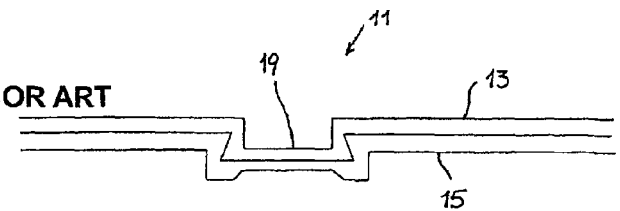
FIGS. 3a and 3b, already described, illustrate a third type of absorber for thermal solar panel according to the prior art.
Figure 3B:
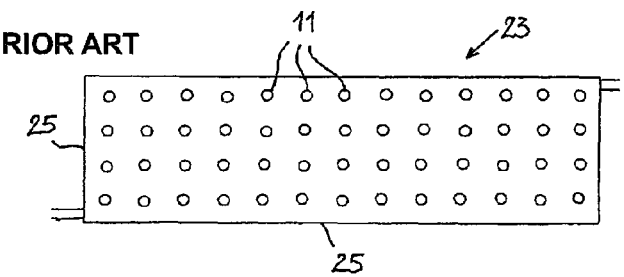

The invention will be described hereinbelow solely by way of example in relation to FIGS. 4 to 8. Reference is made initially to the FIG. 4 which illustrates a plan view of an absorber for a solar panel according to a preferred embodiment of the present invention. The absorber 40 for solar panel is provided to contain heat-bearing fluid 42. The absorber is mainly made by means of two metal plates superposed and fixed together tightly. In this figure, only the upper plate 44 is visible, the lower plate (46, FIG. 6a) being located underneath.

A continuous connection 48 obtained by ultrasonic welding or laser fusion continue of the two plates ensemble is advantageously provided for tight fixing on the periphery of the plates. This first solution proves the simplest and the fastest to carry out, at the same time ensuring proper peripheral tightness. An alternative solution, though less interesting due to being more complex to execute, consists of folding the edges of one of the two plates then sliding the other plate into the gap left between the folded plate and the fold and finally welding the two plates now attached. Another possible solution, equally less interesting c due to being more complex to execute, consists of folding the edges of the two swaged plates at least once onto one another, preferably twice, and wedging them between two flat rods providing a sandwich effect, then applying thereto a rivet at regular intervals to pinch them without passing through the now folded rim and making them tight. Preferably, a 3M adhesive called 'sealskin' is added in between the plates to fully guarantee tightness. This latter solution based on a mechanical crimping system, even though not as easy to implement, proves more solid than the second solution based on welding attached plates, and gives the absorber a rim which is firmer and more rigid for easier handling and placing in the solar panel. It is also noted that the rods, for example made of brass or steel, are cut out at angles of the plates so that they do not overlap, while the tight fit of the corners can be ensured by welding.

Each of the plates 44, 46 is swaged so that its outer face, that is, the face not in contact with the other plate, is covered by a matrix of geometric shapes. The upper plate 44 is therefore covered by a first matrix of geometric shapes 50 protruding on its external face, while the lower plate 46 is covered by a second matrix of geometric shapes 52 equally protruding on its external face.

The two matrices are therefore both inverted relative to one another such that the protuberances of the geometric shapes are oriented to the exterior of the absorber and also relative to one another to the exterior of the absorber and also relative to one another to form a circulation path for heat-bearing fluid 42 in the absorber between the inlet 54 and the outlet 56 of the heat-bearing fluid. The inlet and the outlet are preferably made in the form of admission and evacuation end fittings arranged respectively at one end and at the other end of the circulation path for heat-bearing fluid. So for example the inlet end fitting 54 is used to introduce non-heated heat-bearing fluid into the absorber 40. Next, the heat-bearing fluid 42 passes through the entire absorber by winding through the two matrices to exit heated via the outlet means end fitting 56.

To ensure that the plates are held together firmly, and are capable of resisting pressure exerted by the heat-bearing fluid 42, the plates 44 and 46 are fixed to one another by means of a plurality of connection points 58, 60 non-traversing, distributed over the surface of the absorber. The detail of the arrangement of these connection points relative to forms geometric shapes will be explained in detail hereinbelow in conjunction with FIG. 5. With a view to reinforcing the plates being held together, one or more ultrasonic welding lines 62 or laser fusion lines of the two plates can also be provided. These welding lines 62 are distributed over the surface of the absorber and arranged between the geometric shapes 50, 52.

Figure 4:
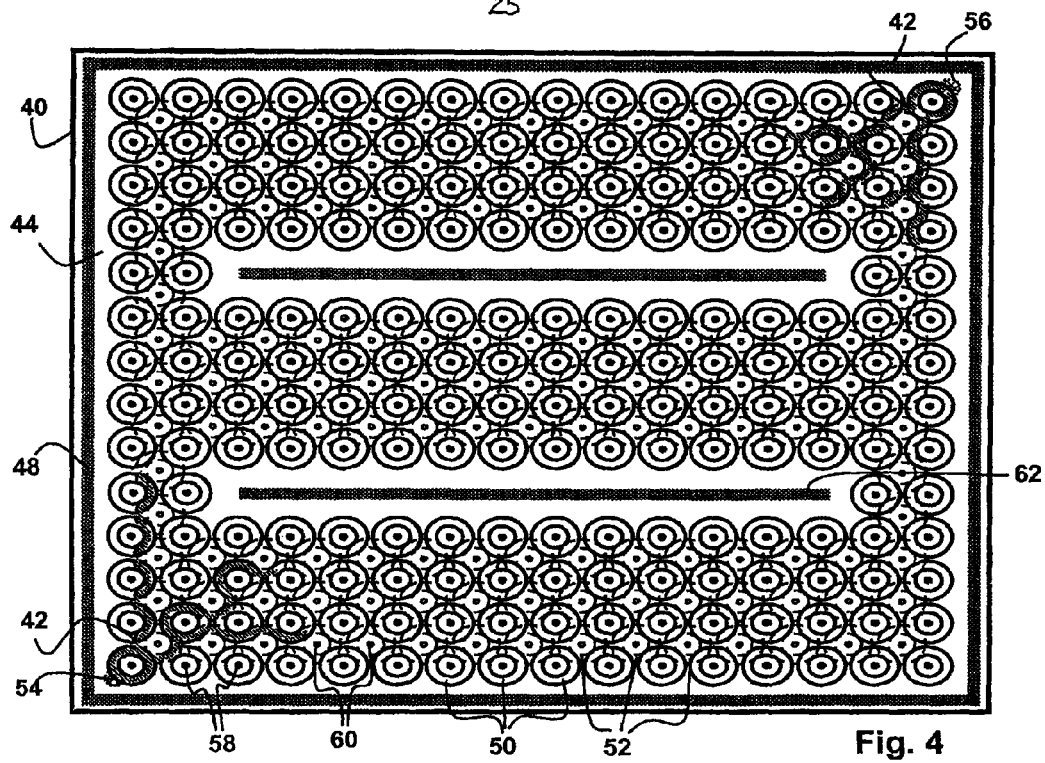
FIG. 4 illustrates a plan view of an absorber for thermal solar panel according to a preferred embodiment of the present invention.

It is evident that the geometric shapes 50, 52 have been illustrated as identical in FIG. 4. But, it is evident that it is perfectly feasible to provide geometric shapes of different shapes to the extent where communication surfaces are provided between the forms 50 of the upper plate and the forms 52 of the lower plate.

Figure 5:
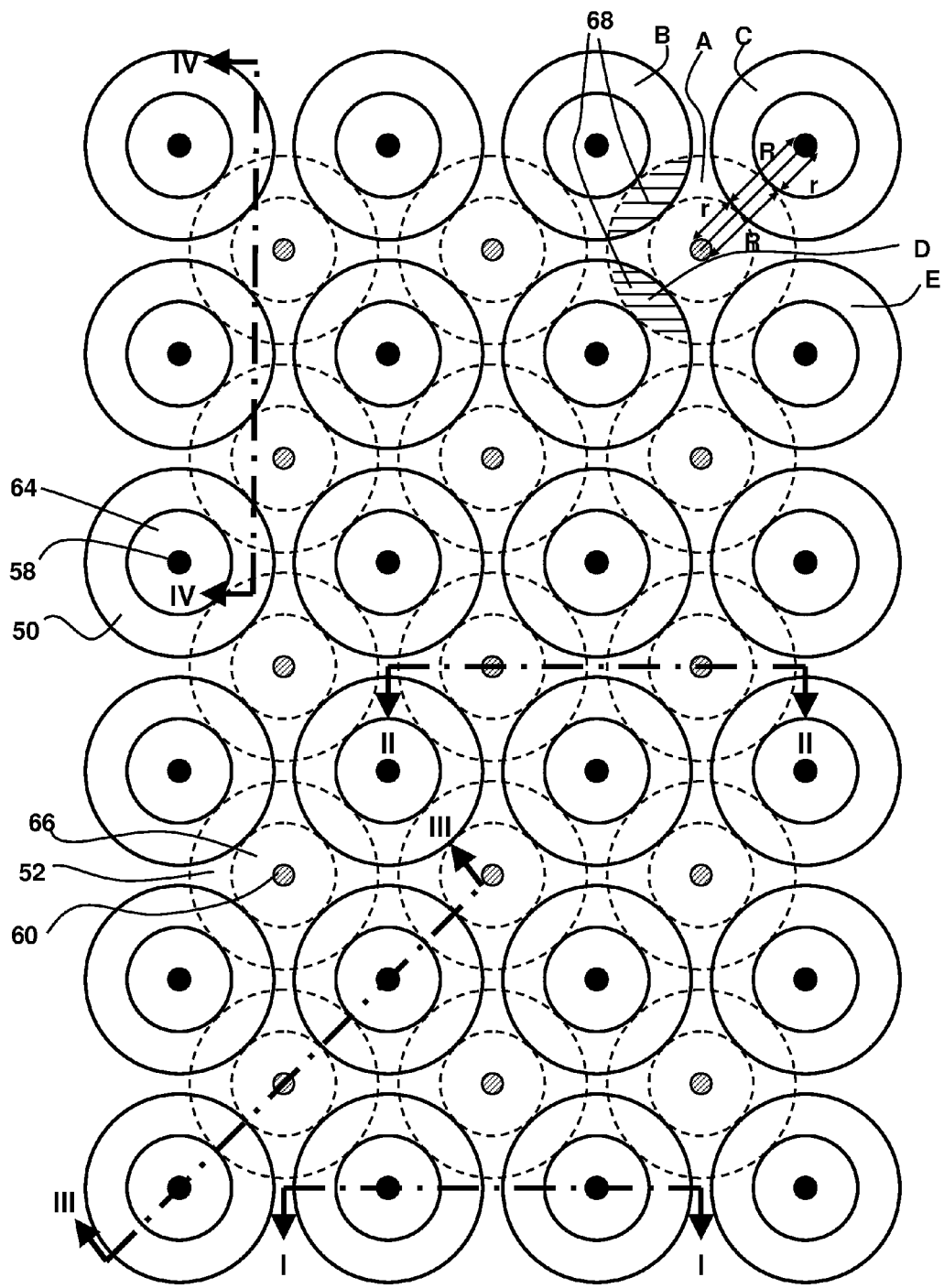
FIG. 5 is an enlargement of portion of the absorber according to the preceding figure.

FIG. 5 is an enlargement of a portion of the absorber of FIG. 4 illustrating in detail the geometric shapes according to a preferred embodiment of the invention. The geometric shapes 50, 52 advantageously have a general annular protruding form. But, it is understood that other forms could also be used, such as for example an open annular form or again a polygonal band form. More generally, it is provided that at least some geometric shapes, and preferably all, are hollow in their centre and define a cavity 64, 66, preferably flat, and that connection points 58, 60, non-traversing, are arranged in at least some of the cavities, preferably all.

It is also evident from FIG. 5 that using an annular form both for the forms swaged on the upper plate and those swaged on the lower plate has the advantage of providing communication surfaces 68 optimised for the path of heat-bearing fluid. According to a preferred variant, the rings of the two surfaces are the same size and offset such that the centre of one ring A located on a surface is far from the centre of each of the adjacent rings B, C, D and E located on the other surface by a length equal to an external radius of a ring plus an inner radius of a ring. Such overlapping of rings gives the best compromise between the size of the communication surface 68 to the extent where the entire bandwidth of a ring covers at a maximum the entire bandwidth of the adjacent ring on the other surface, and the size of the cavity in which the connection point is made, which corresponds to the internal disc of a ring and is therefore maximal.

The non-traversing connection points 58, 60 located in the cavities 64, respectively 66 are made by mechanical deformation of the two plates in the cavity so as to join them together. An advantageous solution consists of making clinching points. These clinching points can be obtained simply by stamping between a punch and a matrix of the cavity to be clinched. Finished examples of clinching points are given in document WO 01/14080. Alternatively, rivets fitting the two plates together can be used without perforating them. The rivets are preferably cylindrical and advantageously have an empty space for fitting plates without perforation of the latter, the material being deformed inside this recess. The interior of the rivets can be soaked in adhesive to reinforce the hold of the fitted plates. Another alternative comprising ultrasonic welding or laser fusion at the level of the cavities could be equally feasible even if it does not fully offer the same guarantee of stability to pressure of the entire absorber.

Figure 6A:
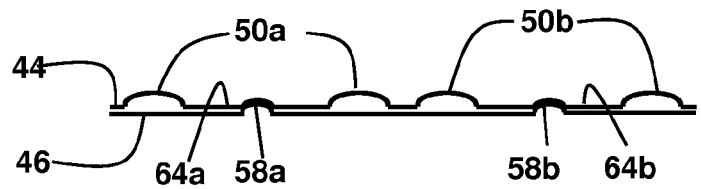
FIGS. 6a, 6b, 6c and 6d illustrate sectional views respectively according to the axes I-I, II-II, III-III and IV-IV, of FIG. 5.
Figure 6B:
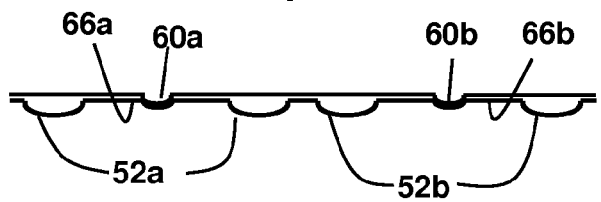
Figure 6C:
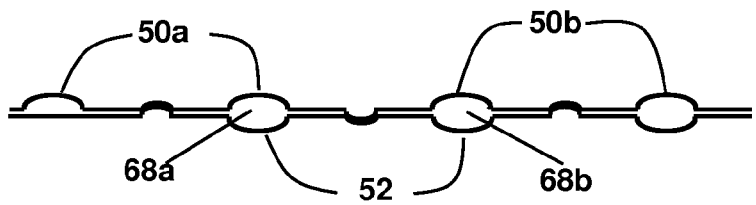
Figure 6D:
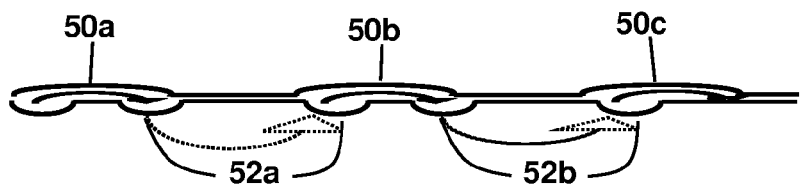

FIGS. 6a and 6d illustrate sectional views respectively according to the axes I-I, II-II, III-III and IV-IV, of FIG. 5, distinguishing the connection points made by clinching, as well as the communication surfaces between geometric shapes defining the path of the heat-bearing fluid.

Section I-I, illustrated in FIG. 6a, has been selected such that the geometric shapes 50 of the upper plate 44 and the corresponding connection points 58 are visible. The annular form of at least some geometric shapes, such as forms 50a and 50b, defines a central cavity 64a, respectively 64b, in which a connection point 58a, respectively 58b is provided, preferably by clinching together of the two plates 44 and 46.

The section II-II, illustrated in FIG. 6b, has been selected such that the geometric shapes 52 of the lower plate 46 and the corresponding connection points 60 are visible. The annular form of the form 52a, respectively 52b, defines a central cavity 66a, respectively 66b, in which connection point, 60a, respectively 60b is provided, preferably by clinching together of the two plates 44 and 46.

The section III-III, illustrated in FIG. 6c, has been selected such that the geometric shapes 50 and 52 of the two plates 44 and 46 as well as the corresponding connection points 58 and 60 are visible. In this figure the communication zones 68a and 68b optimised between the first ring 50a of the upper plate and the ring 52 of the lower plate and respectively between this ring 52 and the second ring 50b of the upper plate are initially evident. It is then evident that it is possible to make the connection points 64 from one and/or from the other side of the absorber. The example illustrated in this figure consists of making the connection points located in the cavities of the rings of the upper plate from the side of the lower plate and inversely. It is understood that other side of the lower plate and inversely. It is understood that other alternatives are feasible.

Finally, section IV-IV, illustrated in FIG. 6d, has been selected so as to make visible the communication between the geometric shapes of the two surfaces without the connection points between the plates being visible. In this figure, the resulting path of the heat-bearing fluid through the absorber is easily identified. In fact, from the viewpoint of the start at the level of the ring 50a located on the upper plate, it is obvious that the liquid it contains will spread in the ring 52a located on the lower plate, which in turn will spread the liquid which has circled the ring 52a, to the ring 50b located on the upper plate, which will similarly spread the liquid to the ring 52b, which spreads it to the ring 52c and so on until it reaches the end outlet means of the absorber. This is how, as planned, winding circulation of heat-bearing fluid through the absorber is achieved.

Figure 7A:
FIGS. 7a, 7b, 7c, 7d, 7e, and 7f illustrate different stages for executing a manufacturing process of an absorber according to an embodiment.
Figure 7B:
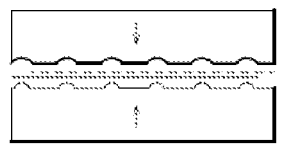
Figure 7C:
Figure 7C:
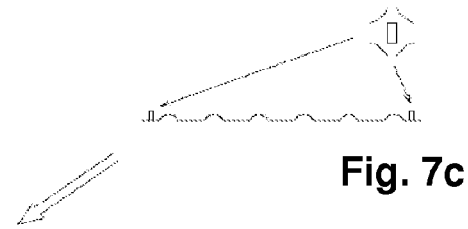
Figure 7D:
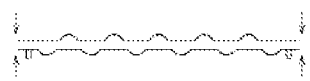
Figure 7E:
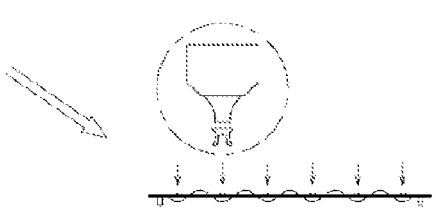
Figure 7F:

FIGS. 7a to 7f illustrate the different stages for carrying out a manufacturing process of an absorber according to an embodiment. First, FIG. 7a illustrates a roller, for example made of copper, aluminium, stainless steel or thermoplastic material, serving as primary material for the plates. Since the material used for the upper plate, specifically that subjected to solar radiation, and the lower plate can be different, a roller is preferably used for each type of plate, lower or upper. So for example the material used could be copper for the lower plates, while for the upper plates the copper will be chromed in advance and rolled separately. This chroming can for example be done by copper-plating a substrate by depositing an initial layer of nickel and a final layer of black chrome. According to the preferred size of the absorber, and therefore of the solar panel, a first stage comprises severing first and second plates from the roller or rollers used. Next, as shown in FIG. 5b and using a press having a matrix of preferred forms, a second stage comprises swaging the first plate to cut out a first matrix of corresponding geometric shapes then swaging the second plate with offset using a press to cut out a second matrix of geometric shapes offset relative to the first matrix of the first plate. It is noted that advantageously the matrix of geometric shapes of the press is asymmetrical and that the swaging steps are simply completed by introducing the first, respectively the second (illustrated in dotted lines), plate at one end, respectively at the other end, of the press. It is also evident that the press also comprises at two of its ends arranged diagonally to the removable peaks for perforating at preferred points two holes on the lower plate on which will be mounted the end fittings of the inlet and outlet means of the heat-bearing fluid, the peaks being removed when the upper plates exit the absorber. FIG. 5c illustrates a stage comprising placing the end fittings at pierced points provided for this purpose, either by screwing or welding or by any other adequate method ensuring proper tightness. FIG. 5d illustrates the stage comprising arranging the two plates so that the matrices of forms have the preferred offset and tightly fixing the rims of the two plates together. The lower plate is illustrated in this figure under the upper plate. This tight fixing stage is advantageously completed by continuous ultrasonic welding of the rims. Other alternatives for tightly fixing the rims of the plates together have been described earlier. The additional welding lines between the geometric shapes will be made preferably at this time, in the event where they are provided. It is also noted that this fixing stage can be carried out after that explained above. FIG. 5e illustrates an important stage comprising connecting the two plates together without traversing them. The example illustrated in this figure refers to the solution for connection points obtained by riveting. It is clear that connection via clinching of the two plates between a matrix and a punch at preferred points could be done in the same way. Advantageously, tightness tests are conducted on the resulting absorber, as illustrated for example in FIG. 5f. The opening of one of the two end fittings is blocked by a stopper, whereas the other opening is connected to a tube putting the absorber under pressure. In this way, any deficiency in the tight connection of the two plates is located and can be repaired. It is clear that in the event where the upper plate is chromed, it is preferably covered by a plastic protective film from the outset of the process, and is removed only at the last moment during installation of the absorber in the frame of the solar panel. Finally, the absorber obtained according to this type of manufacturing process is similar to that illustrated in FIG. 4, and is intended to be incorporated in a thermal solar panel.

Figure 8:
FIG. 8 schematically illustrates an example of a thermal solar panel incorporating an absorber.
Figure 8:
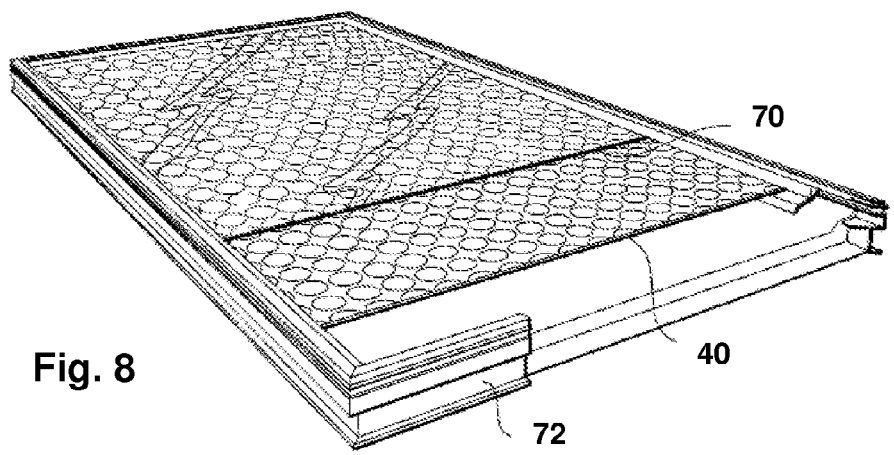

FIG. 8 illustrates schematically an example of a thermal solar panel incorporating an absorber. In this figure, the geometric shapes have been illustrated schematically in the form of a disc for simplification. The absorber 40 is arranged in a frame 72 and covered on the top by a glass plate 70 giving a greenhouse effect between the latter and the preferably blackened upper plate of the absorber. The thermal solar panel also comprises a mechanism ensuring circulation of heat-bearing fluid in the absorber between the first inlet end fitting of the liquid and second outlet end fitting means for evacuating heat-bearing fluid, once heated, through the absorber. As this mechanism is not directly associated with the principle of the present invention, it has not been shown here. According to an advantageous variant embodiment, the lower plate of the absorber is supported by inner rims of the panel.

By way of remarks, it is clear that using copper as metal for the upper plate has the advantage of being a good conductor having good heat yield. Also, copper can be more easily fitted, which makes geometric shapes with greater relief, thus increasing the volume of heat-bearing fluid. The lower metal plate could be aluminium, which is more resistant and stiffens the whole absorber while reducing its thickness. This also ensures proper support on the inner rims of the solar panel incorporating the absorber.

It is evident also that using non-traversing connection points ensures not only tightness of the interior of the absorber, without waste, but also excellent holding together of the plates, as opposed to traditional fixing by welding the plates together and risking being detached during dilation of the heat-bearing fluid contained by the absorber. The total tightness of the absorber is obtained by tightly fixing the rims of the two plates together.

It is clear that various modifications and/or improvements evident to the expert can be made to the abovedescribed present invention without departing from the scope of the invention as defined by the attached claims. In particular, it is clear that the geometric shapes are not necessarily all the same. For example, some forms can be annular and others forms can be circular. There could also be the possibility of having annular forms on a plate and disc forms (i.e. dome) on the other plate. Also, it is clear that connection points are not necessarily present in each hollow form. Finally, it should be noted that the hollow forms intended to receive a connection point in their cavity can have different forms, including an annular, circular or annular elliptical form, open or closed, a hollow polygonal form, for example rectangular or diamond-shaped, or any other hollow form leaving a central cavity sufficiently large to make a connection point.

The invention claimed is:

1. An absorber for solar panel, provided to contain heat-bearing fluid, comprising
    first and second plates extending in a direction and arranged opposite each other and fixed together by means of a plurality of connection points, said first and second plates arranged as a first plate and a second plate with each having an outer face with said outer face of said first plate not in contact with said outer face of said second plate,
    first and second matrices of geometric donut shapes protruding and formed on the outer face respectively of the first and second plates, the matrices of the first plate arranged in a first row and being offset in said direction relative to the matrices of the second plate arranged in a second row adjacent to said first row to ensure a circulation path of the heat-bearing fluid in the absorber, said donut shapes of said first plate are spaced apart from each other and said donut shapes of said second plate are spaced apart from each other, said donut shapes have annular portions with said annular portions on said first plate arranged across but spaced apart from and intersect annular portions on said second plate forming said circulation path and allowing fluid flow across said first and second plates through said path,
    inlet means and outlet means of the heat-bearing fluid arranged respectively at one end and at the other end of the circulation path of the heat-bearing fluid,
    wherein at least some of the geometric shapes have a general protruding form, hollow in its centre so as to define a cavity, and
    in that at least some of said connection points, non-traversing, are arranged in at least some of said cavities.

2. The absorber as claimed in claim 1, wherein the geometric shapes have a general annular protruding shape.

3. The absorber as claimed in claim 1, wherein the non-traversing connection points located in cavities are made by mechanical deformation of the two plates so as to join them together.

4. The absorber as claimed in claim 1, wherein the non-traversing connection points located in cavities are points for clinching the two plates together.

5. The absorber as claimed in claim 1, wherein the non-traversing connection points located in cavities are rivets fitting the two plates together without perforating them.

6. The absorber as claimed in claim 1, wherein a continuous connection at the periphery of the plates is obtained by ultrasonic welding or laser welding of the two plates together.

7. The absorber as claimed in claim 1, wherein at least one ultrasonic welding line or laser welding line of the two plates is made between the geometric shapes.

8. The absorber as claimed in claim 1, wherein the inlet means and outlet means of the heat-bearing fluid are arranged diagonally opposite on flat portions of the outer face of the first plate opposite to the geometric shapes arranged on the second plate.

9. A thermal solar panel comprising an absorber arranged in a frame and covered by a glass plate, in which is mounted an absorber as claimed in claim 1, provided to contain the heat-bearing fluid.

10. The thermal solar panel as claimed in claim 9, wherein the lower plate is supported by inner rims of the panel.

* * * * *